United States Patent [19]
Shimada et al.

[11] Patent Number: 6,132,800
[45] Date of Patent: Oct. 17, 2000

[54] PRODUCTION PROCESS OF COLOR LIQUID CRYSTAL DISPLAY DEVICE

[75] Inventors: Tetsuya Shimada, Zama; Shigetoshi Sugawa, Atsugi; Takeshi Miyazaki, Ebina; Takeshi Ichikawa, Hachioji, all of Japan

[73] Assignee: Canon Kabushiki Kaisha, Tokyo, Japan

[21] Appl. No.: 08/804,406

[22] Filed: Feb. 21, 1997

[30] Foreign Application Priority Data

Feb. 27, 1996 [JP] Japan ................................. 8-063889
Feb. 13, 1997 [JP] Japan ................................. 9-028735

[51] Int. Cl.[7] ................................................ B05D 5/06
[52] U.S. Cl. .................... 427/108; 427/162; 427/165; 427/256; 427/287; 427/385.5; 427/407.2
[58] Field of Search .................... 427/162, 108, 427/165, 385.5, 105, 106, 287, 407.2, 256; 430/20

[56] References Cited

U.S. PATENT DOCUMENTS

| | | | |
|---|---|---|---|
| 5,079,214 | 1/1992 | Long et al. | 503/227 |
| 5,281,450 | 1/1994 | Yaniv | 427/510 |
| 5,340,619 | 8/1994 | Chen et al. | 424/498 |
| 5,513,028 | 4/1996 | Sono et al. | 359/87 |
| 5,552,192 | 9/1996 | Kashiwazaki et al. | 427/492 |
| 5,578,404 | 11/1996 | Kliem | 430/20 |

FOREIGN PATENT DOCUMENTS 5-257137  10/1993  Japan .
8-36173   2/1996   Japan .

*Primary Examiner*—Janyce Bell

[57] ABSTRACT

Disclosed herein is a process for producing a color liquid crystal display device, which comprises the steps of forming a plurality of switching elements on a first transparent substrate; providing a coating layer on the plural switching elements; separately applying curable inks to predetermined opening areas between the switching elements by an ink-jet system to form a color filter; forming a transparent electrode on the color filter; forming a transparent electrode on a second transparent substrate; and charging a liquid crystal into a space between the first and second transparent substrates.

24 Claims, 18 Drawing Sheets

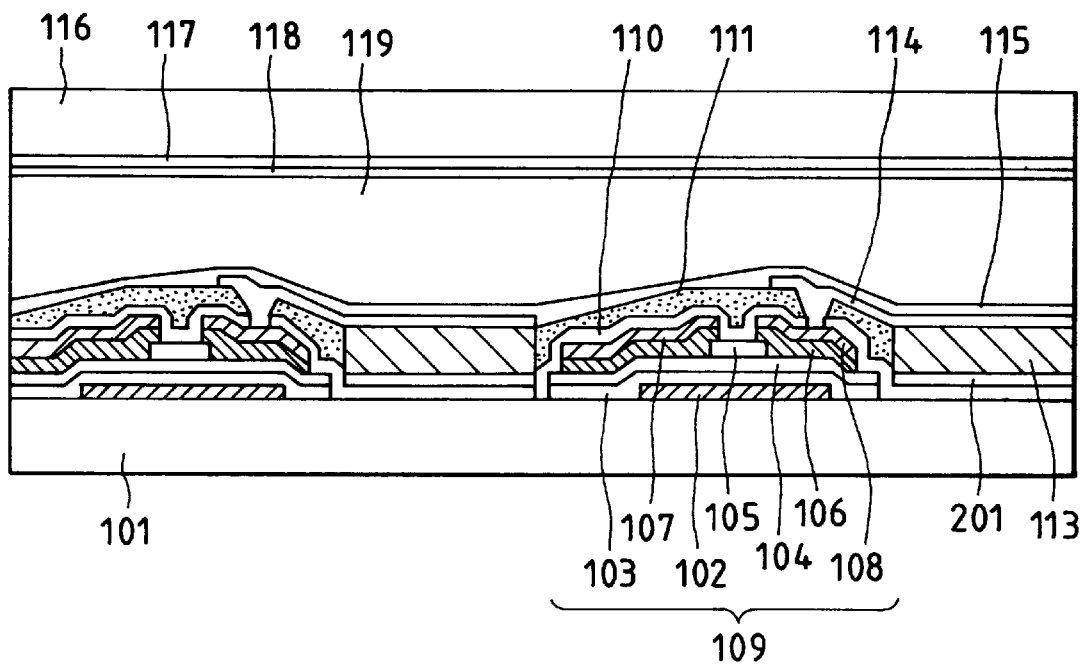
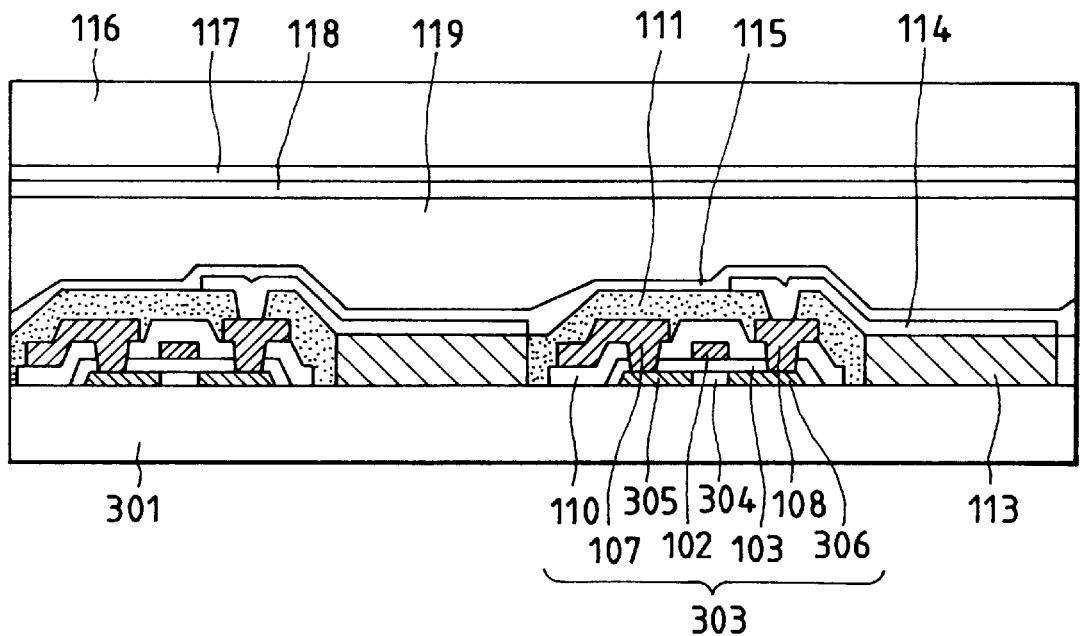

6,132,800

PRODUCTION PROCESS OF COLOR LIQUID CRYSTAL DISPLAY DEVICE

BACKGROUND OF THE INVENTION

1. Field of the Invention

The present invention relates to a process for producing a color liquid crystal display device, and particularly to a process for producing a color liquid crystal display device having a color filter and a black matrix.

2. Related Background Art

As an example of the conventional color liquid crystal display devices having a color filter, may be mentioned a device disclosed in Japanese Patent Application Laid-Open No. 5-257137. This device includes a first glass substrate, a second glass substrate and a liquid crystal charged into a space between both glass substrates. A plurality of switching elements and transparent pixel electrodes electrically connected to the respective switching elements are formed on the first glass substrate, and a color filter is provided on each of the transparent pixel electrodes. Besides, a transparent common electrode is provided on the second glass substrate.

FIG. 18 is a cross-sectional view illustrating the construction on the side of the first glass substrate. As illustrated in this drawing, a thin film transistor (hereinafter referred to as "TFT") 109 composed of a gate electrode 102, a gate insulating film 103, an amorphous silicon film 104, a source electrode 107 and a drain electrode 108 are formed on the glass substrate 101. A transparent pixel electrode 114 is connected to the drain electrode 108. All the elements other than the transparent pixel electrodes 114 are covered with a passivation film 110 composed of a plasma nitride film. Further, a color filter 113 is formed on the transparent pixel electrode 114.

In this construction, gate voltage applied to the gate electrode 102 is changed over high or low upon the operation of image display to turn the TFT 109 On or Off, whereby a display data signal applied to the source electrode 107 is written in the transparent pixel electrode 114. The alignment of liquid crystal molecules is controlled by the action of this writing voltage and voltage applied to the common electrode formed on the second glass substrate (not illustrated) to make display.

In the case of the color liquid crystal display device disclosed in the prior art document, the display data signal is applied to the liquid crystal through the color filter on the pixel electrode, so that the writing voltage undergoes voltage drop due to the interposition of the color filter. Therefore, sufficient voltage is not applied to the liquid crystal, so that contrast characteristics are lowered. In order to ensure satisfactory contrast characteristics, it is necessary to increase the writing voltage. The necessity has invited increase in costs attending upon increase in consumption of electric power and formation of peripheral driving circuits resistant to high voltage.

In the prior art document, the color filter is formed by an electrodeposition process. In the electrodeposition process, the same process must be conducted 3 times in order to form colored layers of R (red), G (green) and B (blue), so that the number of processes increases, which involves disadvantages from the viewpoints of cost and yield.

Japanese Patent Application Laid-Open No. 8-36173 discloses a process for the production of a liquid crystal display device including the steps of providing a color-receiving base layer on a TFT array substrate, subjecting the base layer to patterning of ink receptivity and applying coloring materials for a color filter to the thus-treated layer using an ink-jet apparatus to form a color filter.

However, this process involves disadvantages from the viewpoints of cost and yield because it includes the complicated process of providing the color-receiving base layer and subjecting the base layer to patterning.

SUMMARY OF THE INVENTION

The present invention has thus been made with a view toward solving the above-described problems and has as its object the provision of a process for producing a color liquid crystal display device, good in yield and high in reliability and low at cost, which can prevent the drop of voltage applied to a liquid crystal due to the interposition of a color filter and has good contrast characteristics even when driven by a low voltage.

The above object can be achieved by the present invention described below.

According to the present invention, there is thus provided a process for producing a color liquid crystal display device, which comprises the steps of forming a plurality of switching elements on a first transparent substrate; providing a coating layer on the plural switching elements; separately applying curable inks to predetermined opening areas between the switching elements by an ink-jet system to form a color filter; forming a transparent electrode on the color filter; forming a transparent electrode on a second transparent substrate; and charging a liquid crystal into a space between the first and second transparent substrates.

According to the present invention, there is also provided a process for producing a color liquid crystal display device, which comprises the steps of forming a plurality of switching elements on a first transparent substrate; providing a coating layer on the plural switching elements; forming a transparent electrode in each of opening areas between the switching elements; separately applying curable inks to the predetermined opening areas between the switching elements by an ink-jet system to form a color filter; forming a transparent electrode on the color filter; forming a transparent electrode on a second transparent substrate; and charging a liquid crystal into a space between the first and second transparent substrates.

BRIEF DESCRIPTION OF THE DRAWINGS

FIG. 6 is a cross-sectional view illustrating a part of a color liquid crystal display device according to a second embodiment of the present invention.

FIG. 8 is a cross-sectional view illustrating a part of a color liquid crystal display device according to a third embodiment of the present invention.

DESCRIPTION OF THE PREFERRED EMBODIMENTS

According to the present invention, a coating layer such as a light-screening layer and/or a passivation film is provided on a plurality of switching elements (for example, TFT) provided on a transparent substrate, a curable ink is applied to each of opening areas between the switching elements by an ink-jet system to form a color filter, and a transparent electrode is further formed on the color filter, whereby a color liquid crystal display device which is free of the drop of voltage applied to a liquid crystal due to the interposition of a color filter and has good contrast characteristics even when driven by a low voltage can be produced with high reliability by a shortened process.

The present invention will hereinafter be described with reference to the preferred embodiments.

<The First Embodiment>

A color liquid crystal display device according to the first embodiment of the present invention will be first described.

Figure 1:
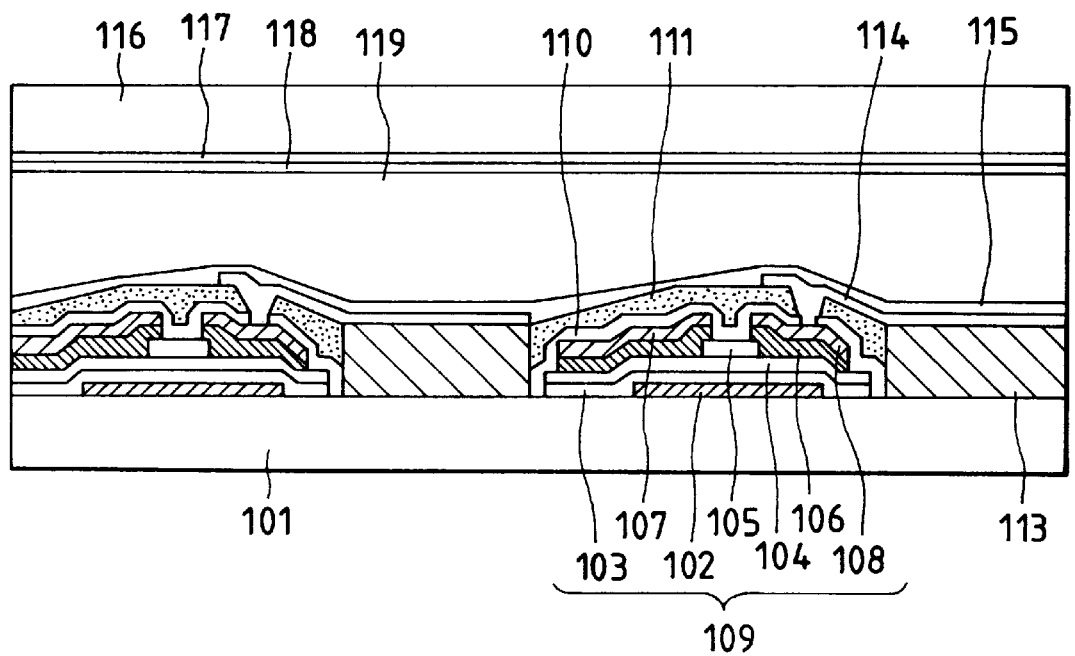
FIG. 1 is a cross-sectional view illustrating a part of a color liquid crystal display device according to a first embodiment of the present invention.

FIG. 1 is a cross-sectional view of a part of the color liquid crystal display device according to the first embodiment produced by the production process of the present invention. As illustrated in this drawing, a TFT 109, which is a switching element composed of a gate electrode 102, a gate insulating film 103, an i-type amorphous silicon film 104, an ohmic contact layer 106, a source electrode 107 and a drain electrode 108, is formed on a first transparent substrate (for example, a glass substrate) 101. A transparent pixel electrode 114 is connected to the drain electrode 108 through a passivation film 110 and a light-screening layer 111. A color filter 113 is formed between the transparent pixel electrode 114 and the transparent substrate 101. An alignment film 115 is formed over the whole surface of the TFT 109 and the transparent pixel electrodes 114. Reference numeral 105 is an etching stopping layer.

On the other hand, a common electrode 117 and an alignment film 118 are formed on a second transparent substrate (for example, a glass substrate) 116. The second transparent substrate 116 is arranged in opposed relation to the first transparent substrate 101 at an interval of about 5 µm. A liquid crystal 119 is charged into a space between both substrates.

FIGS. 2A to 2L are cross-sectional views illustrating preferable production processes of the color liquid crystal display device shown in FIG. 1. In these cross-sectional views, FIGS. 2A to 2L correspond to the following processes (a) to (l), respectively.

(a) The gate electrodes 102 are formed from Cr, Ta or the like in a film thickness of about 2,000 angstroms on the glass substrate 101 in accordance with a method known per se in the art.

(b) The gate insulating film 103 is formed in a film thickness of about 5,000 angstroms on the gate electrodes 102. A single-layer film formed of SiN, $Si_3N_4$, TaO, $Ta_2O_5$ or the like or a multi-layer film obtained by laminating these insulating films is used for the gate insulating film 103.

(c) The i-type amorphous silicon film 104 and an etching stopping layer 105 are formed in a film thickness of about 2,000 angstroms on the gate insulating film 103. The etching stopping layer 105 serves to protect the i-type amorphous silicon film 104 so as not to damage the i-type amorphous silicon film 104, which forms channel regions, by etching in a process (f) which will be described subsequently, and is formed with a material, which is different in etching rate from, in particular, the i-type amorphous silicon film 104 and the ohmic contact layer 106, for example, an insulating film of SiN, $Si_3N_4$ or the like.

(d) The etching stopping layer 105 is subjected to patterning.

(e) The ohmic contact layer 106 is formed in a film thickness of about 300 angstroms on the i-type amorphous silicon film 104 and the etching stopping layer 105. $n^+$-type amorphous silicon or microcrystalline silicon is used for the ohmic contact layer 106.

(f) The source electrodes 107 and the drain electrode 108 are formed on the ohmic contact layer 106, and unnecessary portions of the ohmic contact layer 106, i-type amorphous silicon film 104 and gate insulating film 103 are removed by etching to form the switching element, TFT 109. Al, Mo or the like is used for the source electrodes 107 and the drain electrodes 108.

(g) The TFT 109 is covered with the passivation film 110 formed of SiN or the like, and the light-screening layer 111 composed of a resin is formed on the passivation film 110. A photosensitive acrylic resin, in which carbon black or a mixture of red, blue and green pigments has been dispersed, is used for the light-screening layer 111. After this resin is applied to form the light-screening layer, the layer is exposed through a mask.

The light-screening layer 111 preferably has the ability to prevent color mixing so as to prevent a color ink from mixing with adjacent colored portions in the subsequent process of forming the color filters by an ink-jet system. For this purpose, a material having an ink repellency is selected.

(h) Portions of the passivation film 110 and the light-screening layer 111 corresponding to the opening areas 120 are removed by development, and a contact hole 112 is made on the drain electrode 108.

(i) Curable inks 100 each containing a coloring material of red, green or blue, a solvent and a curable resin are separately applied to the predetermined opening areas 120 by an ink-jet system.

The resin contained in the curable ink is preferably a thermosetting resin which is transparent and has high heat resistance. As such a resin, an acrylic, epoxy or melamine resin is preferably used.

A weight ratio of the coloring material to the resin in the ink is preferably within a range of from 1:10 to 10:1. If the proportion of the coloring material is higher than the upper limit of the above range, the coloring material may be more than the resin can hold it and hence dissolve out of the resin. If the proportion of the resin is higher than the upper limit of the above range on the other hand, the thickness of the colored layer becomes too thick, so that the colored layer tends to reduce its transparency or cause cracks.

In the ink, the coloring material and the resin are dissolved or dispersed in water or a mixed solvent containing water and a water-soluble organic solvent. In this case, it is preferable to control the total solids content of the coloring material and the resin within a range of from 6 to 40% by weight based on the total weight of an ink. With respect to the amount of the ink having such a solids content to be applied, it is preferable from the viewpoint of formation of a color filter having a flattened surface to apply the ink in such a manner that the level of the ink becomes higher than the height from the substrate to the light-screening layer, which is a coating layer. If the level of the ink applied is lower than the height up to the light-screening layer, the evenness of the color filter surface is reduced after heat curing.

The use of such a curable ink makes it unnecessary to provide an ink-receiving layer in advance as described in Japanese Patent Application Laid-Open No. 8-36173 because the curable ink cures with the coloring material held by the resin layer.

(j) each curable ink is cured by heating to form the color filter 113 the surface of which is flattened.

(k) The transparent pixel electrode 114 composed of ITO is formed on the color filter 113 and connected to the drain electrode 108 through the contact hole 112. Further, the alignment film 115 composed of polyimide is formed over the whole surface of the TFT 109 and the transparent pixel electrode 114.

(l) On the other hand, the glass substrate 116 on which the common transparent electrode 117 and the alignment film 118 have been formed is arranged in opposed relation to the glass substrate 101 on which the TFT 109, the color filter 113 and the like have been formed, and the liquid crystal 119 is charged into the space between both substrates.

Figure 2A:
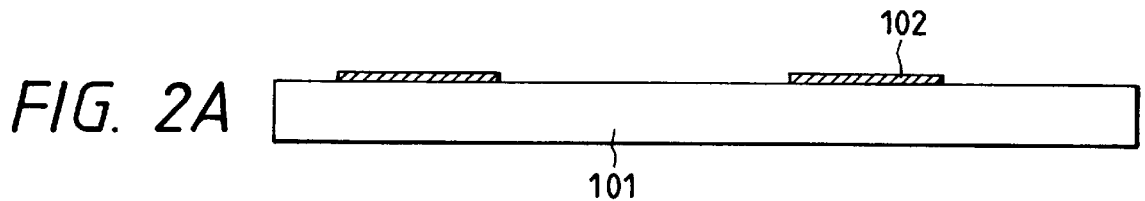
FIGS. 2A, 2B, 2C, 2D, 2E, 2F, 2G, 2H, and 2L are cross-sectional views illustrating production processes of the color liquid crystal display device according to the first embodiment of the present invention.
Figure 2B:
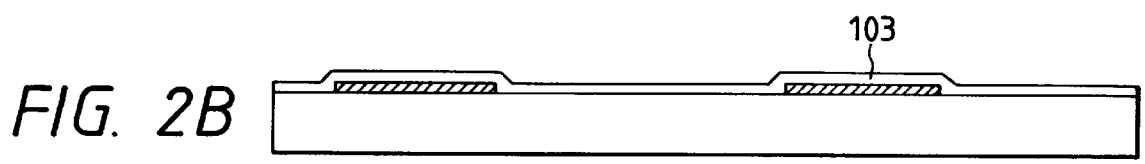
Figure 2C:
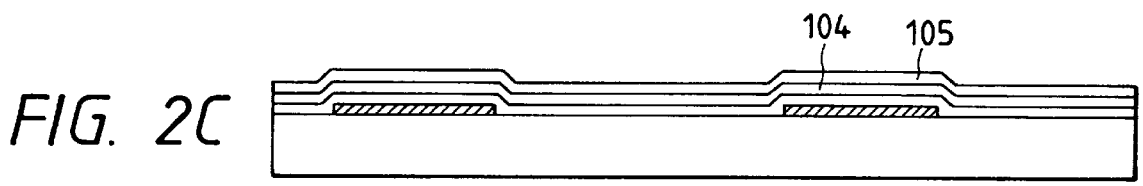
Figure 2D:
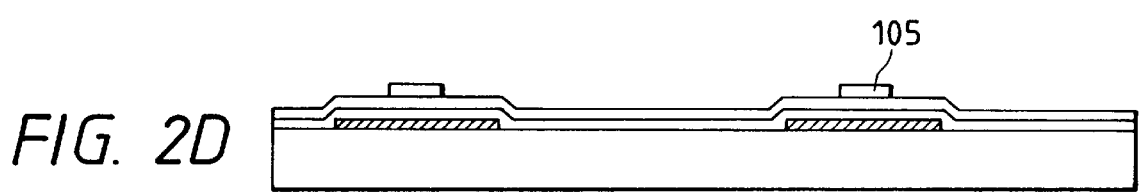
Figure 2E:
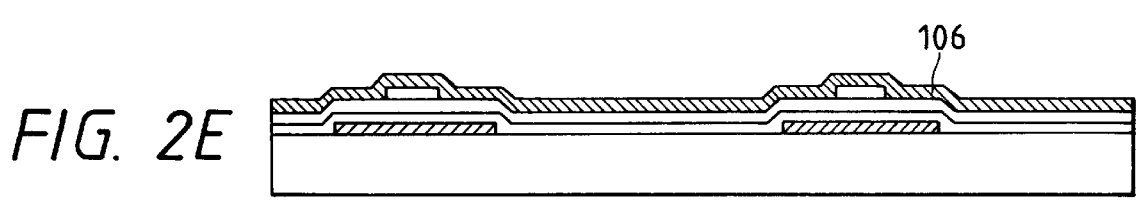
Figure 2F:
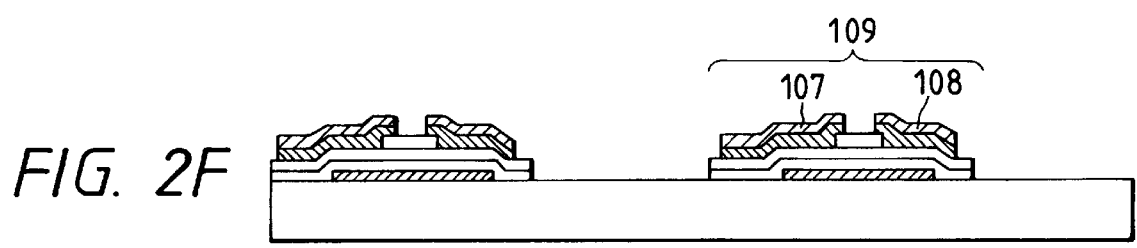
Figure 2G:
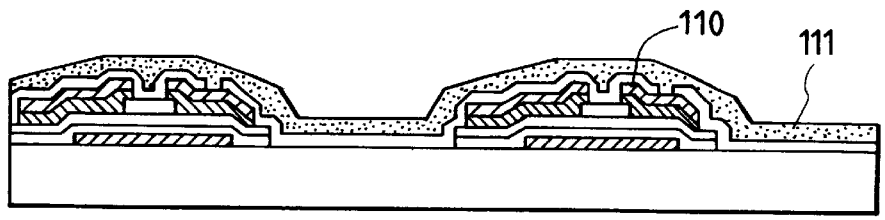
Figure 2H:
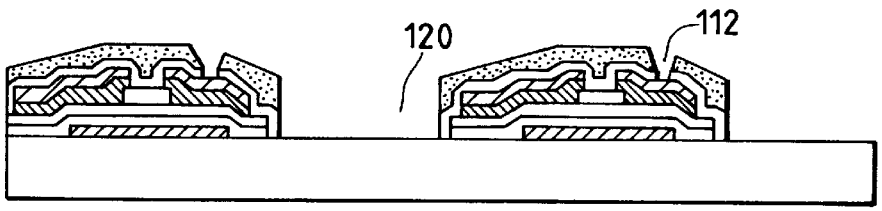
Figure 2I:
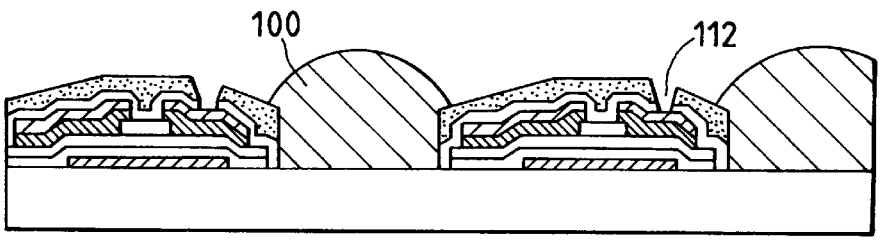
Figure 2J:
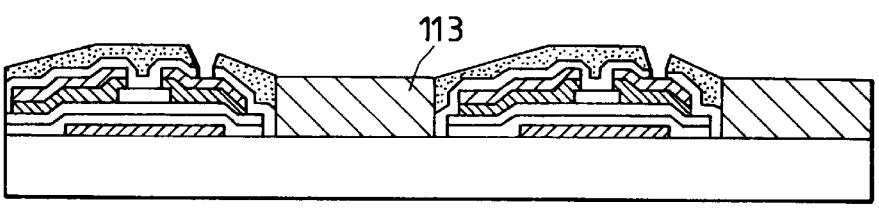
Figure 2K:
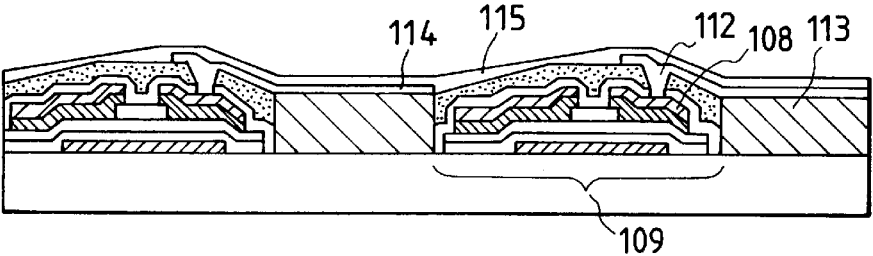
Figure 2L:
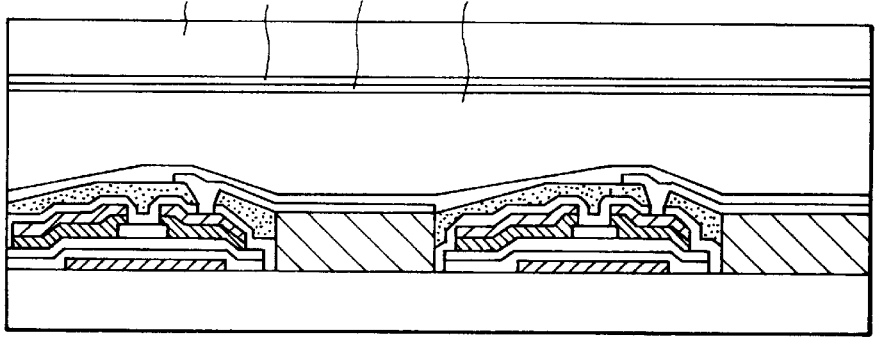
Figure 3:
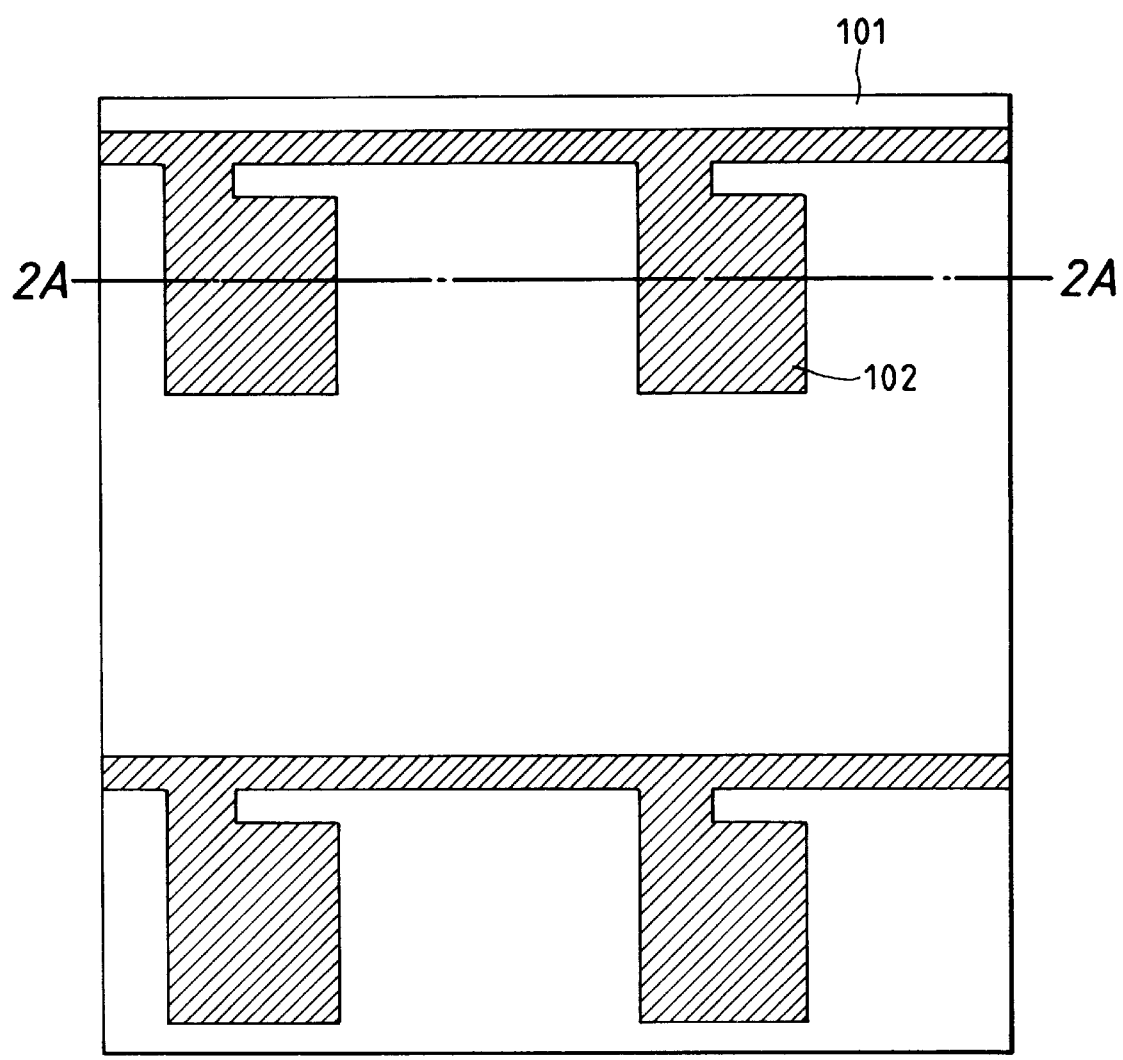
FIG. 3 is a plan view illustrating a production process of the color liquid crystal display device according to the first embodiment of the present invention.
Figure 4:
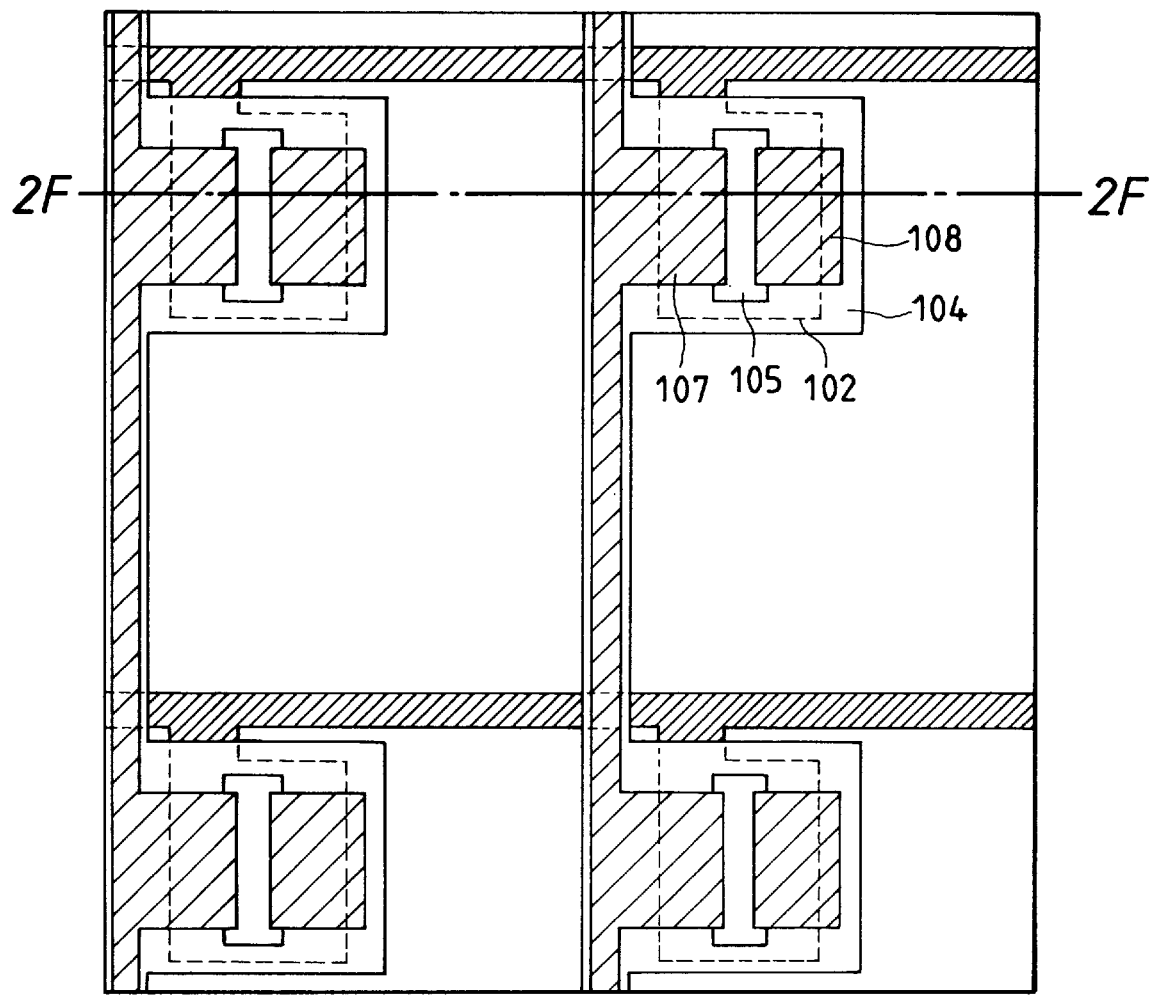
FIG. 4 is a plan view illustrating a production process of the color liquid crystal display device according to the first embodiment of the present invention.
Figure 5:
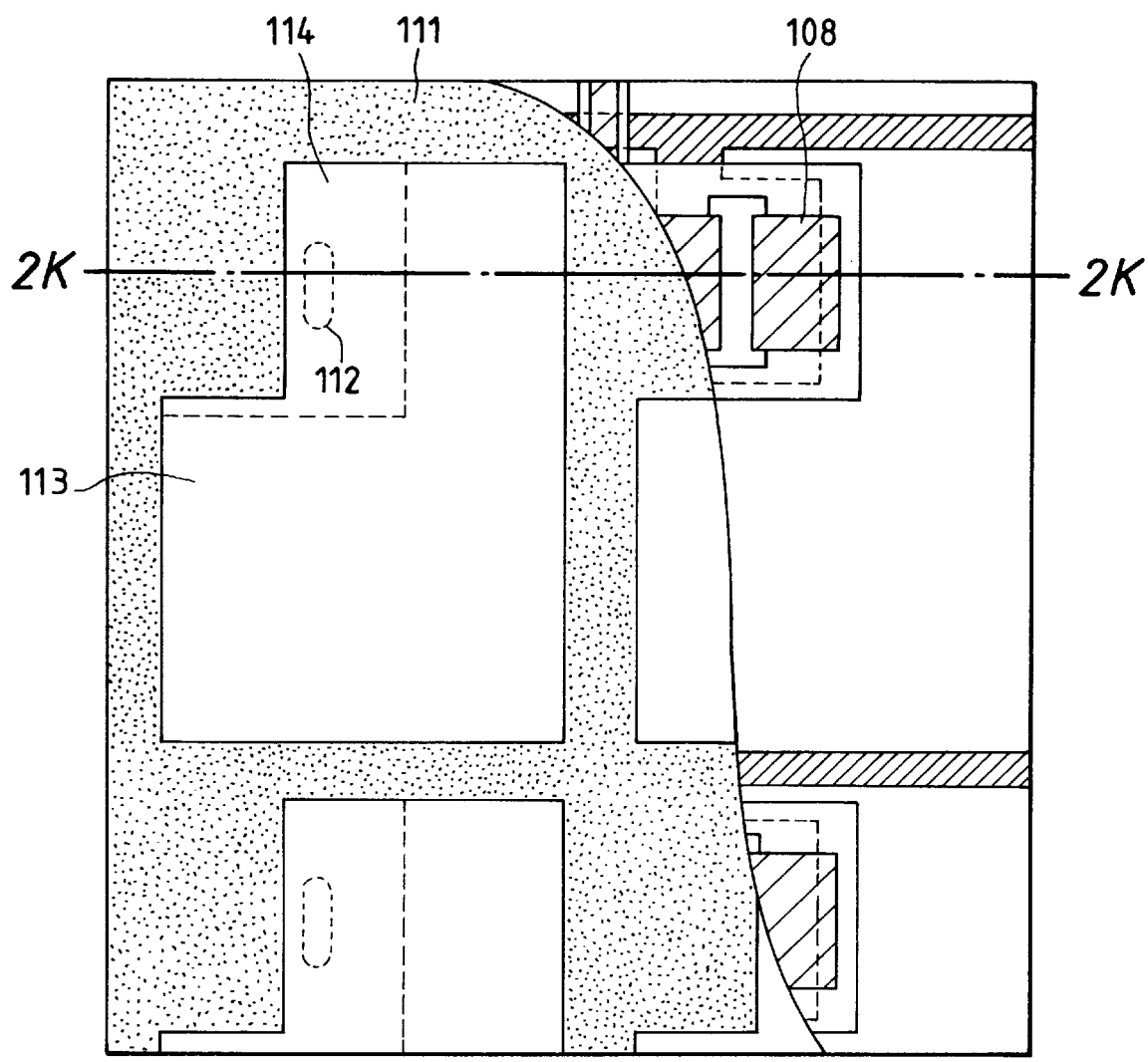
FIG. 5 is a plan view illustrating a production process of the color liquid crystal display device according to the first embodiment of the present invention.
Figure 7A:
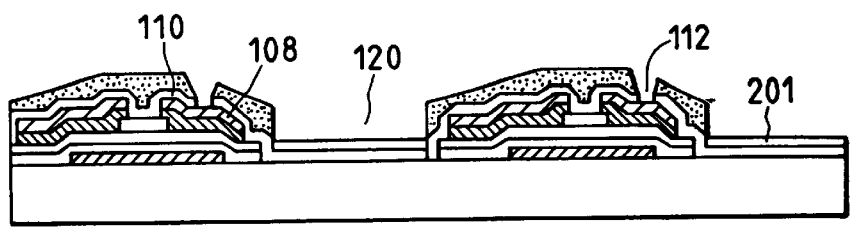
FIGS. 7A, 7B, 7C, 7D and 7E are cross-sectional views illustrating production processes of the color liquid crystal display device according to the second embodiment of the present invention.
Figure 7B:
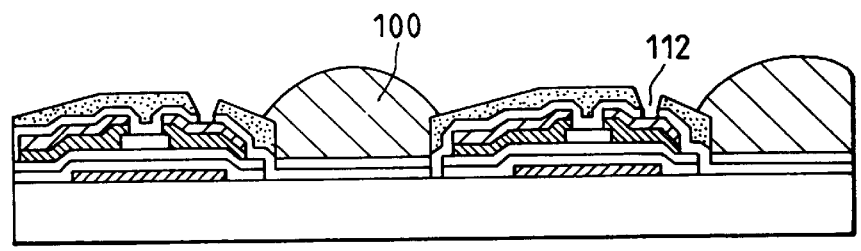
Figure 7C:
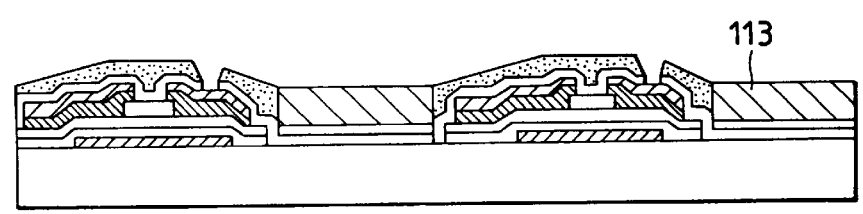
Figure 7D:
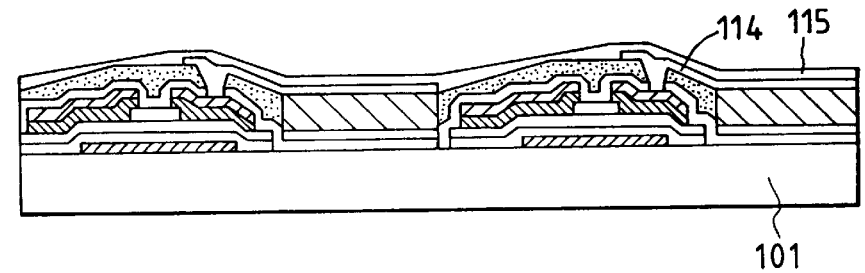
Figure 7E:
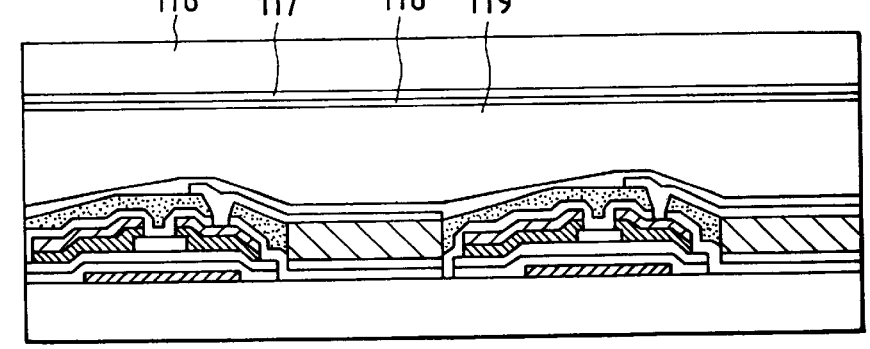

FIGS. 3 to 5 are plan views illustrating production processes of the color liquid crystal display device shown in FIG. 1, and cross-sectional views taken along respective lines 2A—2A, 2F—2F and 2K—2K in FIGS. 3 to 5 correspond to FIG. 2A, FIG. 2F and FIG. 2K, respectively.

FIG. 3 is a plan view corresponding to FIG. 2A, and the gate electrodes 102 on the glass substrate 101 are commonly connected every line.

FIG. 4 is a plan view corresponding to FIG. 2F, and the source electrodes 107 are commonly connected every row and arranged perpendicularly to the gate electrodes 102 commonly connected every line. The gate insulating film 103 (not illustrated), i-type amorphous silicon film 104 and ohmic contact layer 106 (not illustrated) formed on each of the gate electrodes 102 also act as interlayer films in the intersection between the gate electrode 102 and the source electrode 107. Reference numerals 105 and 108 are an etching stopping layer and a drain electrode, respectively.

FIG. 5 is a plan view (the alignment film 115 is not illustrated) corresponding to FIG. 2K. The drain electrode 108 is connected to the transparent pixel electrode 114 through the contact hole 112. The light-screening layer 111 covers the outer peripheral region of the color filter 113 except for the contact hole 112. Incidentally, the contact hole 112 is shielded from light by the drain electrode 108.

In this embodiment, each color filter is formed between the glass substrate and the transparent pixel electrode, so that the drop of voltage applied to the liquid crystal due to the interposition of the color filter is prevented, and good contrast characteristics even when driven by a low voltage can hence be realized at low cost.

According to this embodiment, the light-screening layer is formed on the TFT and the outer periphery of the color filter, so that high precision alignment becomes unnecessary upon the superposition of the first glass substrate and the second glass substrate.

In this embodiment, the color filter is formed by an ink-jet system without need of providing an ink-receiving layer due to containing the curable resin in the ink. Therefore, a color liquid crystal display device can be produced by decreased number of processes and at low cost.

<The Second Embodiment>

A color liquid crystal display device according to the second embodiment of the present invention will be now described.

FIG. 6 is a cross-sectional view illustrating a part of a color liquid crystal display device according to the second embodiment produced by the production process of the present invention. In the drawing, like reference numerals are given to the same parts as those shown in FIGS. 1 to 5, and their description is omitted.

In this device, as illustrated in FIG. 6, each color filter 113 is formed between a transparent pixel electrode 114 and a glass substrate 101, and a light-screening layer 111 is formed on TFT 109, so that the same effect as in the first embodiment is brought about. In this device, a transparent electrode 201 is further formed between the color filter 113 and the glass substrate 101 to form a storage capacitor between the transparent pixel electrode 114 and the transparent electrode 201 through the color filter 113. As a result, better contrast characteristics can be realized.

Production processes of the color liquid crystal display device shown in FIG. 6 are illustrated in FIGS. 7A to 7E. The production processes for this device are the same as the production processes for the color liquid crystal display device illustrated in FIGS. 2A to 2L except for the process shown in FIG. 2H. Therefore, only the processes of (h) to (l) are illustrated in FIGS. 7A to 7E.

(h) Subsequent to the process shown in FIG. 2G, a portion of the light-screening layer 111 corresponding to each of opening areas 120 is removed by development, a contact hole 112 is made on each of drain electrodes 108, and the transparent electrode 201 is formed on a passivation film 110 situated in the opening area 120.

Hereafter, the same processes as those shown in FIGS. 2I to 2L are followed. A curable ink 100 is applied to the opening area 120 by an ink-jet system (i) to form color filters 113 (j), and transparent pixel electrodes 114 and an alignment film 115 (k) on the first glass substrate 101, followed by formation of a transparent common electrode 117 and an alignment film 118 on a second glass substrate 116. Thereafter, both substrates are superposed and stuck on each other, and a liquid crystal 119 is charged into a space between both substrates (l).

<The Third Embodiment>

A color liquid crystal display device according to the third embodiment of the present invention will be now described.

FIG. 8 is a cross-sectional view illustrating a part of a color liquid crystal display device according to the third embodiment of the present invention. This device is a device using TFT different in construction from those used in the color liquid crystal display devices illustrated in FIGS. 1 and 6. In the drawing, like reference numerals are given to the same parts as those shown in FIG. 1 to FIG. 7E, and their description is omitted.

As illustrated in FIG. 8, TFT 303 each composed of a polysilicon film containing a channel region 304, a source region 305 and a drain region 306, a gate insulating film 103, a gate electrode 102, a source electrode 107 and a drain electrode 108 are formed on a quartz substrate 301. A transparent pixel electrode 114 is connected to the drain electrode 108 through a passivation film 110 and a light-screening layer 111.

In this device, also, a color filter is arranged between the transparent pixel electrode 114 and the quartz substrate 301, and the light-screening layer is provided on the TFT, whereby low voltage drive and precision of superposition between the substrates can be improved like the color liquid crystal display device shown in FIG. 1.

FIGS. 9A to 9L are cross-sectional views illustrating production processes of the color liquid crystal display device shown in FIG. 8. In these cross-sectional views, FIGS. 9A to 9L correspond to the following processes (a) to (l), respectively.

(a) The polysilicon films 302 having a film thickness of about 300 angstroms and the gate insulating films 103 having a film thickness of about 1,000 angstroms are formed on the quartz substrate 301. A material such as $SiO_2$ is used for the gate insulating films 103.

(b) The gate electrode 102 is formed in a film thickness of about 2,800 angstroms on each of the gate insulating films 103. A material such as polysilicon is used for the gate electrode 102.

(c) P ion is implanted into each of the polysilicon films 302 from above the gate electrode 102 to form the n-type source region 305 and drain region 306. The channel region 304 retains i-type.

(d) A passivation film 110 is formed in a film thickness of about 7,500 angstroms over the whole surface of the gate insulating film 103 and the gate electrode 102. A material such as $SiO_2$ is used for the passivation film 110.

(e) The source electrode 107 and the drain electrode 108 are formed on the source region 305 and the drain region 306, respectively. A material such as polysilicon or Al is used for the source electrode 107 and drain electrode 108.

(f) The light-screening layer 111 is formed on the TFT 303. As a material for the light-screening layer 111, there is used the same material as that used in the devices according to the first and second embodiments.

(g) A portion of the light-screening layer 111 corresponding to each of opening areas 120 is removed by development, and a contact hole 112 is made on each of the drain electrodes 108.

(h) A curable ink 100 is applied to the opening area 120 by an ink-jet system. As materials for the ink 100, there is used the same materials as used in the devices according to the first and second embodiments.

(i) The curable ink is cured by heating to form the color filter 113 the surface of which is flattened.

(j) The transparent pixel electrode 114 composed of ITO is formed on the color filter 113 and connected to the drain electrode 108 through the contact hole 112.

(k) An alignment film 115 composed of polyimide is formed over the whole surface of the TFT 303 and transparent pixel electrode 114.

(l) On the other hand, a common transparent electrode 117 and an alignment film 118 are formed on a glass substrate 116, and the glass substrate 116 is then arranged in opposed relation to the quartz substrate 301 to stick both substrates on each other. A liquid crystal 119 is charged into the space between both substrates.

FIGS. 10 to 13 are plan views illustrating production processes of the color liquid crystal display device shown in FIG. 8, and cross-sectional views taken along respective lines 9A—9A, 9B—9B, 9E—9E and 9J—9J in FIGS. 10 to 13 correspond to FIG. 9A, FIG. 9B, FIG. 9E and FIG. 9J, respectively.

Figure 9A:
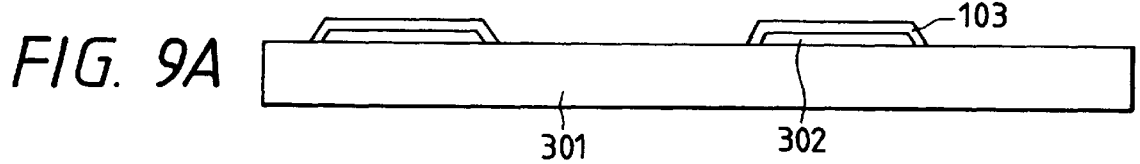
FIGS. 9A, 9B, 9C, 9D, 9E, 9F, 9G, 9H, 9I, 9J and 9L are cross-sectional views illustrating production processes of the color liquid crystal display device according to the third embodiment of the present invention.
Figure 10:
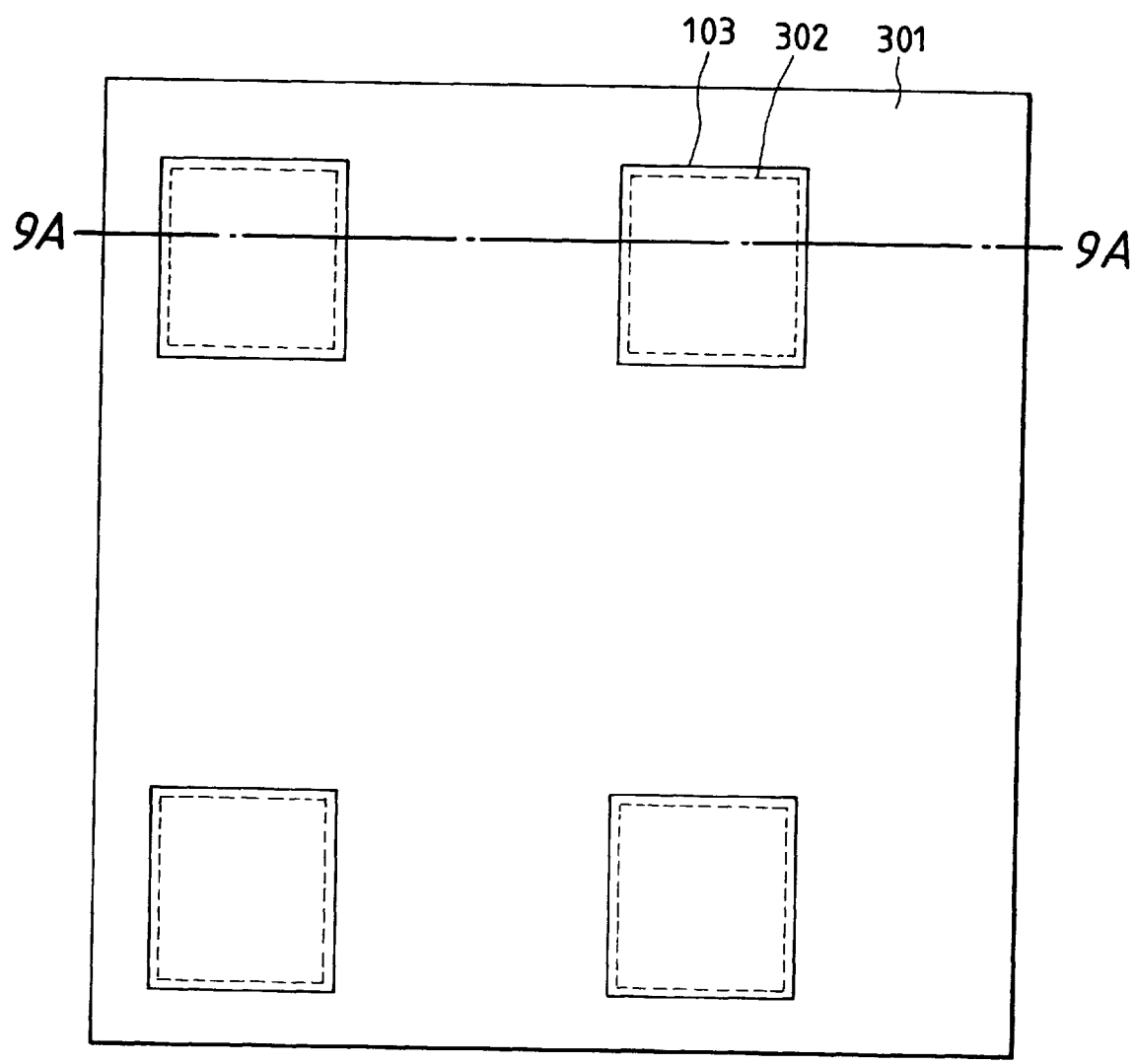
FIG. 10 is a plan view illustrating a production process of the color liquid crystal display device according to the third embodiment of the present invention.

FIG. 10 is a plan view corresponding to FIG. 9A, and the polysilicon films 302 and the gate insulating films 103 are formed on the quartz substrate 301.

Figure 9B:
Figure 11:
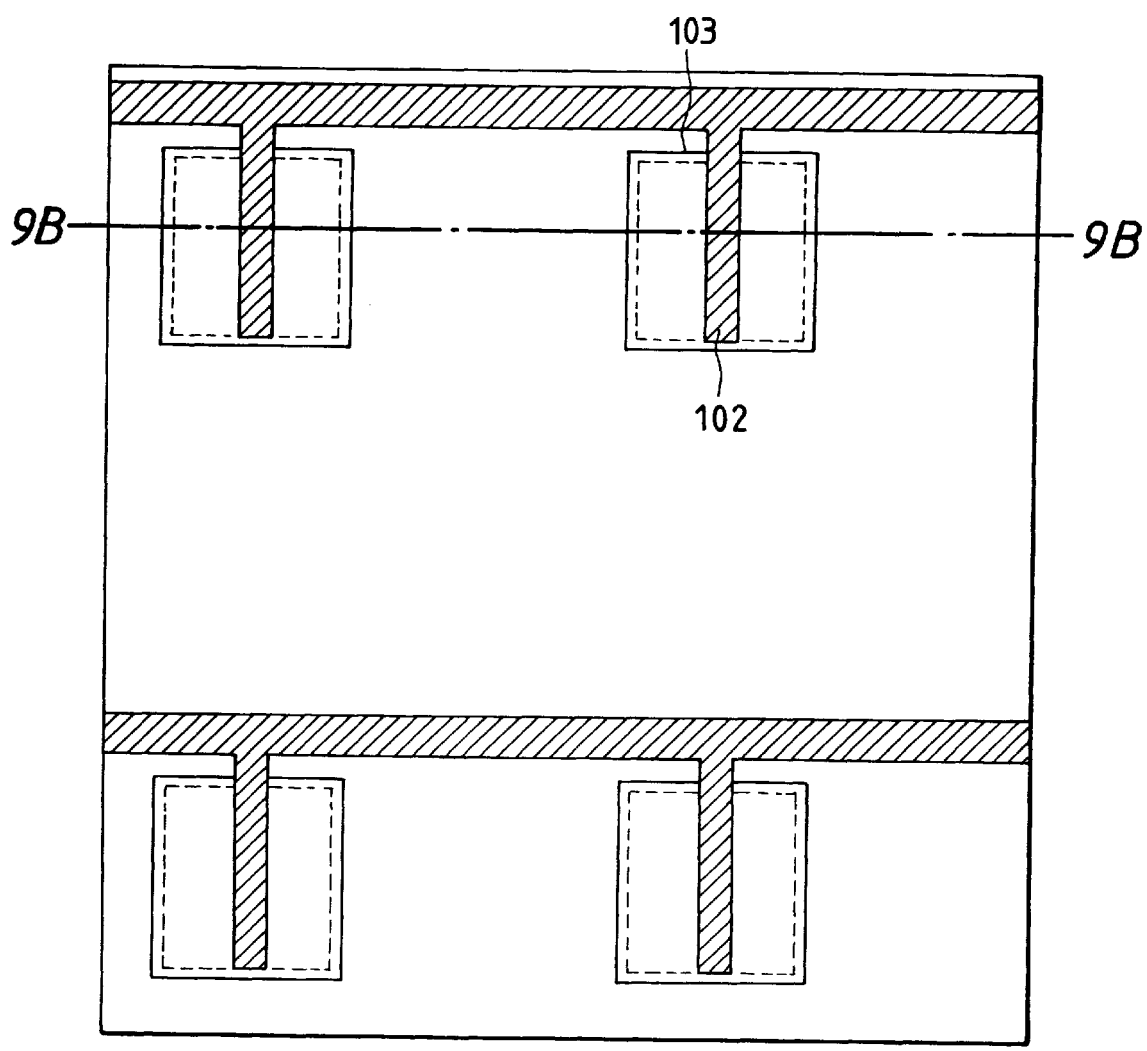
FIG. 11 is a plan view illustrating a production process of the color liquid crystal display device according to the third embodiment of the present invention.

FIG. 11 is a plan view corresponding to FIG. 9B, and the gate electrodes 102 are formed on the gate insulating films 103 and commonly connected every line.

Figure 9C:
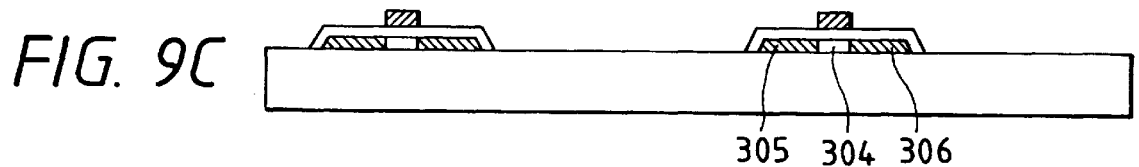
Figure 9D:
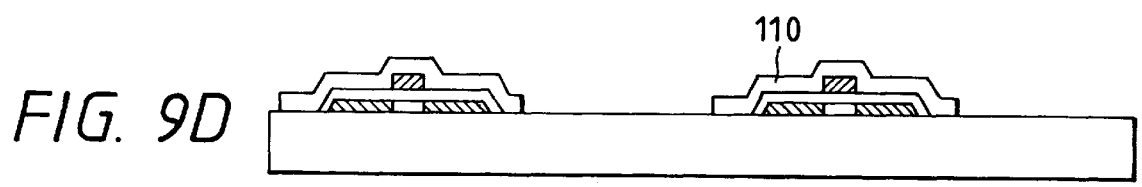
Figure 9E:
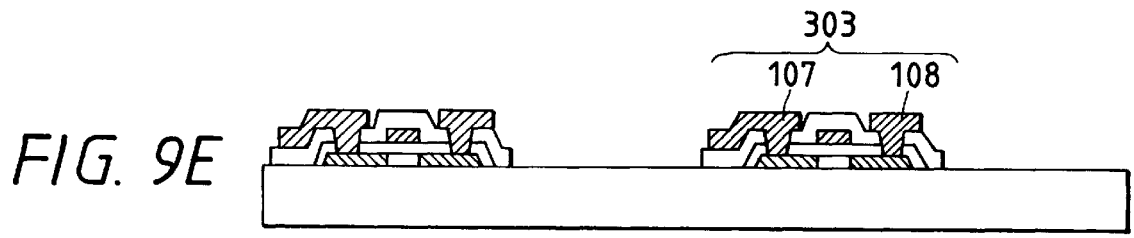
Figure 9F:
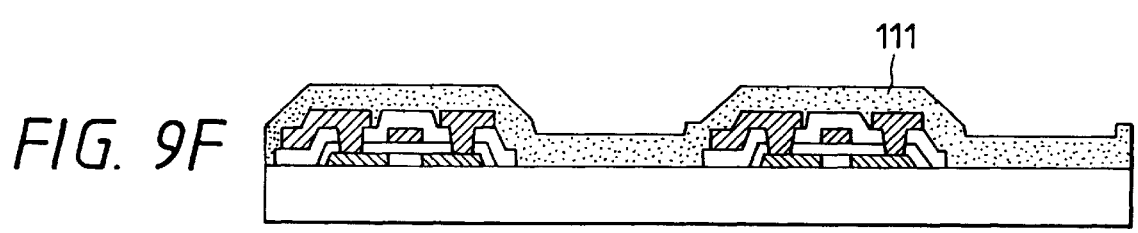
Figure 12:
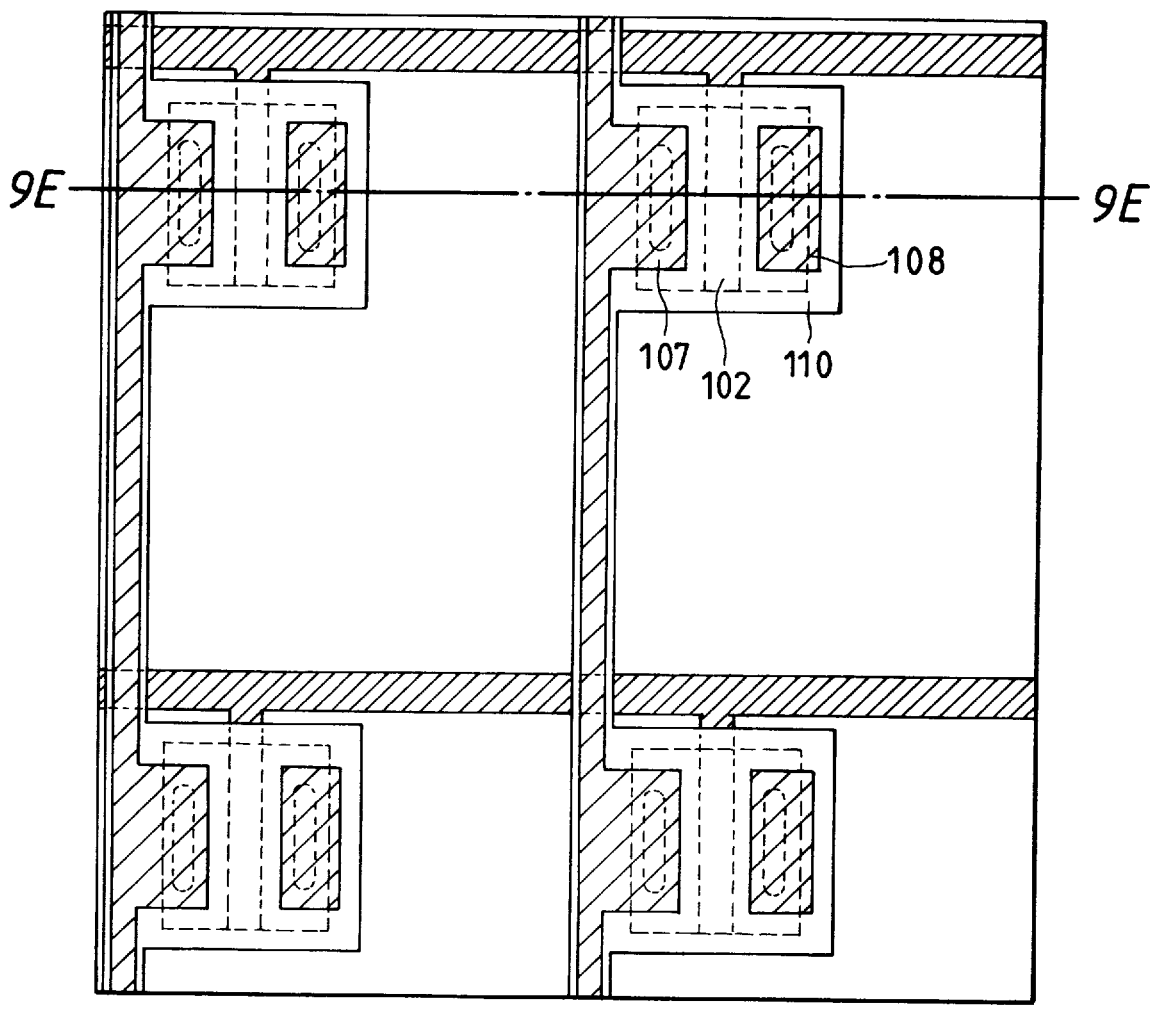
FIG. 12 is a plan view illustrating a production process of the color liquid crystal display device according to the third embodiment of the present invention.

FIG. 12 is a plan view corresponding to FIG. 9E, and the passivation film 110 is formed on the gate electrode 102, source region 304 (not illustrated) and drain region 306 (not illustrated), after which the source electrode 107 and drain electrode 108 are further formed. The source electrodes 107 are commonly connected every row and arranged perpendicularly to the gate electrodes 102 commonly connected every line. The passivation film 110 formed on the gate electrode 102 also acts as an interlayer film in the intersection between the gate electrode 102 and the source electrode 107.

Figure 9G:
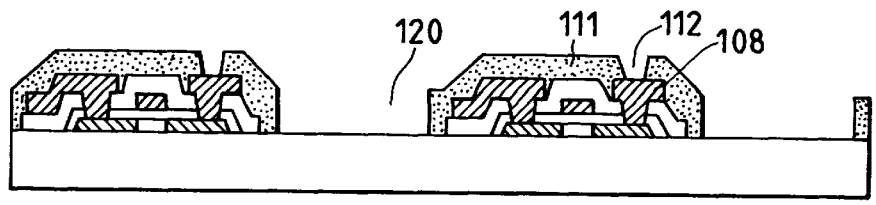
Figure 9H:
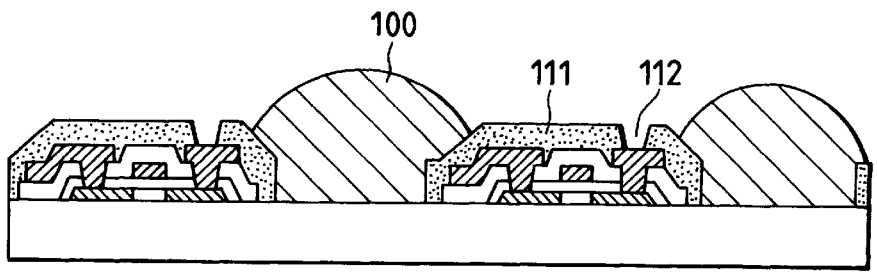
Figure 9I:
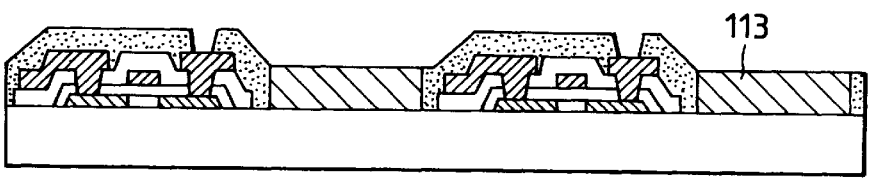
Figure 9J:
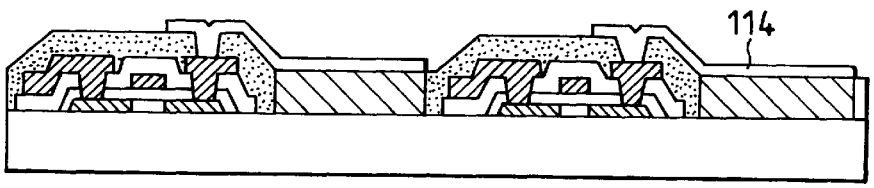
Figure 9K:
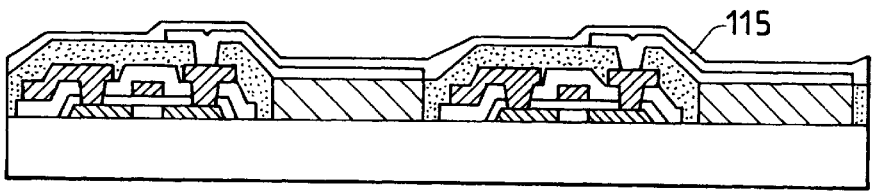
Figure 9L:
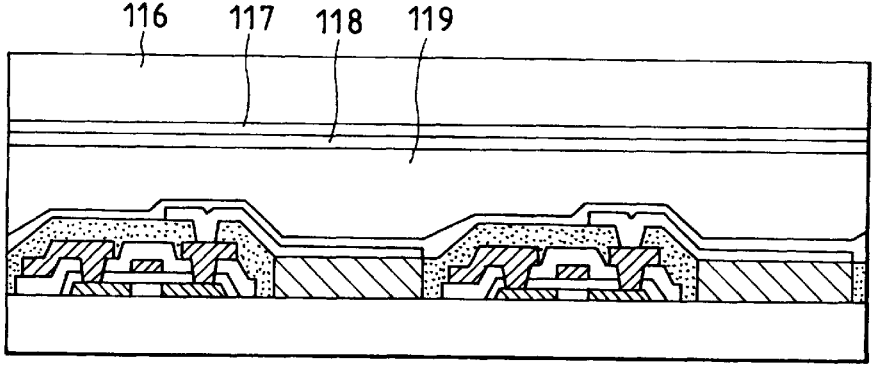
Figure 13:
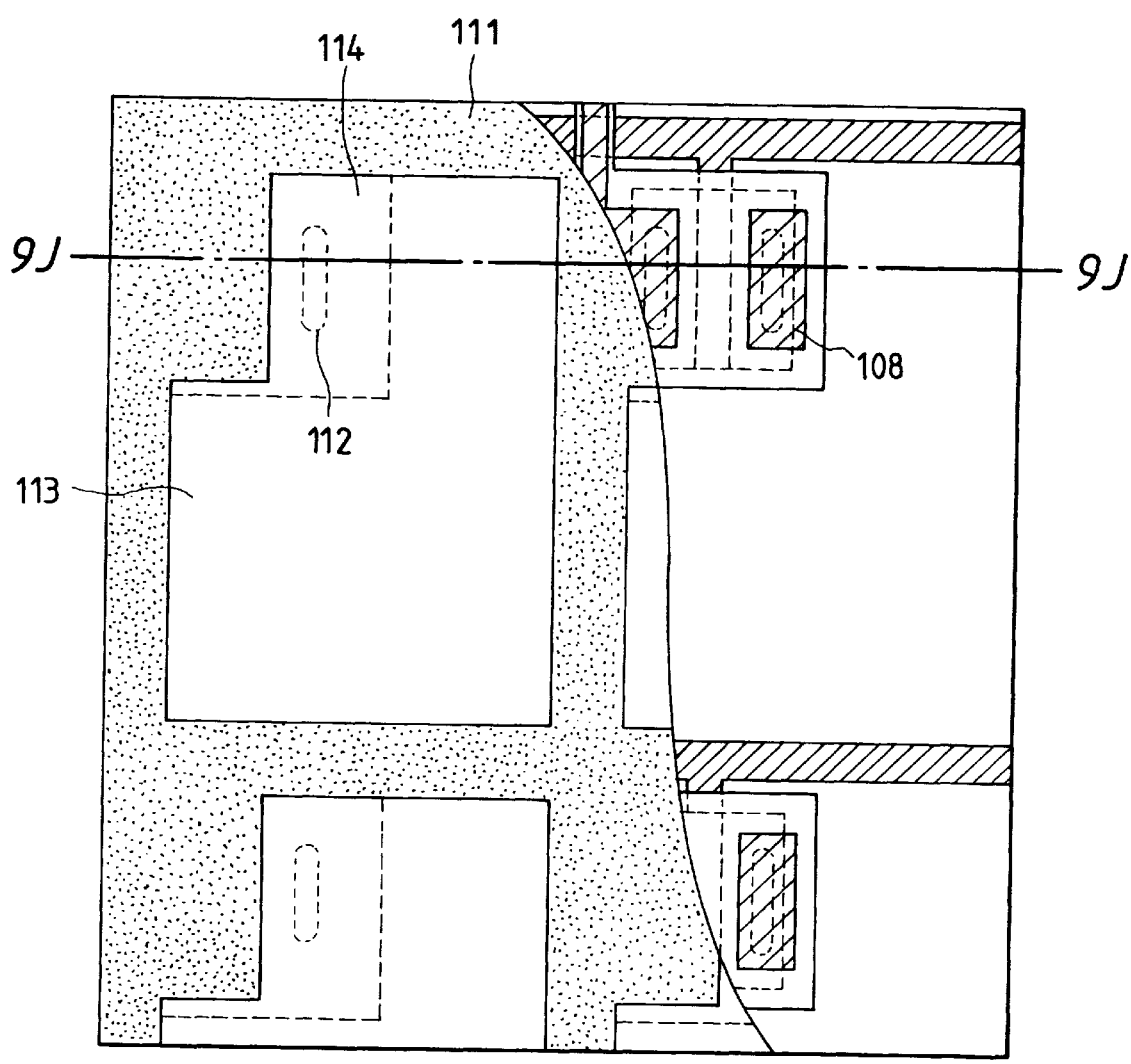
FIG. 13 is a plan view illustrating a production process of the color liquid crystal display device according to the third embodiment of the present invention.

FIG. 13 is a plan view corresponding to FIG. 9J, and each drain electrode 108 is connected to the transparent pixel electrode 114 through the contact hole 112. The light-screening layer 111 covers the outer peripheral region of the color filters 113 except for the contact holes 112. Incidentally, the contact hole 112 is shielded from light by the drain electrode 108.

<The Fourth Embodiment>

A color liquid crystal display device according to the fourth embodiment of the present invention will be now described.

Figure 14:
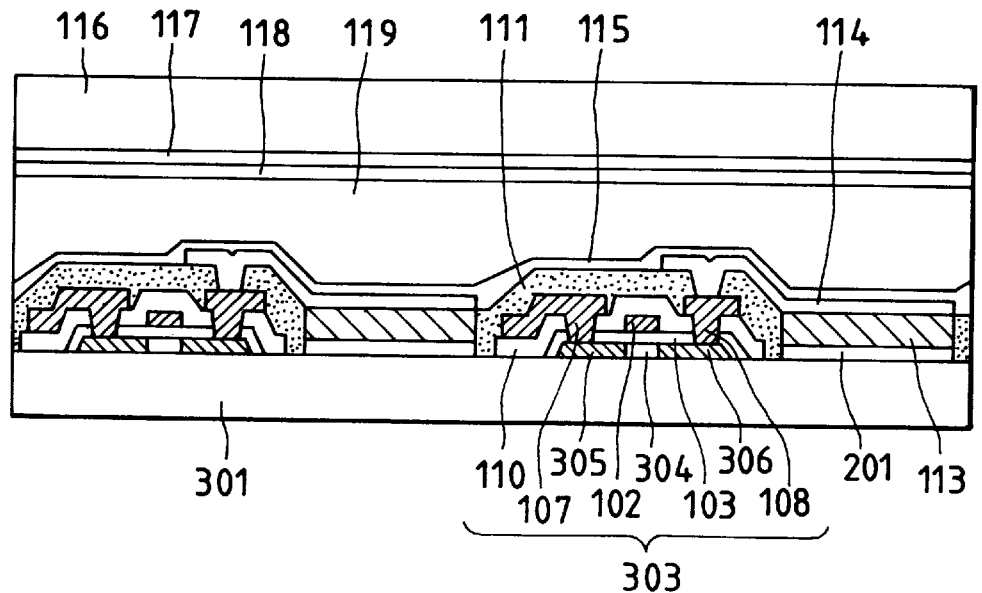
FIG. 14 is a cross-sectional view illustrating a part of a color liquid crystal display device according to a fourth embodiment of the present invention.

FIG. 14 is a cross-sectional view illustrating a part of a color liquid crystal display device according to the fourth embodiment of the present invention. This device is such that a transparent electrode 201 is further formed between each color filter 113 and the quartz substrate 301 of the color liquid crystal display device illustrated in FIG. 8, thereby forming a storage capacitor between the transparent pixel electrode 114 and the transparent electrode 201 through the color filter 113. Other reference numerals are the same as given in FIGS. 1 and 8. As a result, contrast characteristics can be more improved.

Production processes of the color liquid crystal display device shown in FIG. 14 will be now described. The production processes for this device are the same as the production processes for the color liquid crystal display device illustrated in FIGS. 9G to 9L except that a new process (g') is added after the process (g). Therefore, only the processes of (g') to (l) are illustrated in FIGS. 15A to 15F.

(g') Subsequent to the process shown in FIG. 9G, the transparent electrode 201 is formed at each of opening areas 120.

Hereafter, the same processes as those shown in FIGS. 9H to 9L are followed. A curable ink 100 is applied to the opening area 120 by an ink-jet system (h) and cured by heating to form a color filter 113 (i), and a transparent pixel electrode 114 (j) and an alignment film 115 (k) on the quartz substrate 301, followed by formation of a transparent common electrode 117 and an alignment film 118 on a second glass substrate 116. Thereafter, both substrates are superposed and stuck on each other, and a liquid crystal 119 is charged into a space between both substrates (l).

<The Fifth Embodiment>

A color liquid crystal display device according to the fifth embodiment of the present invention will be now described.

Figure 16:
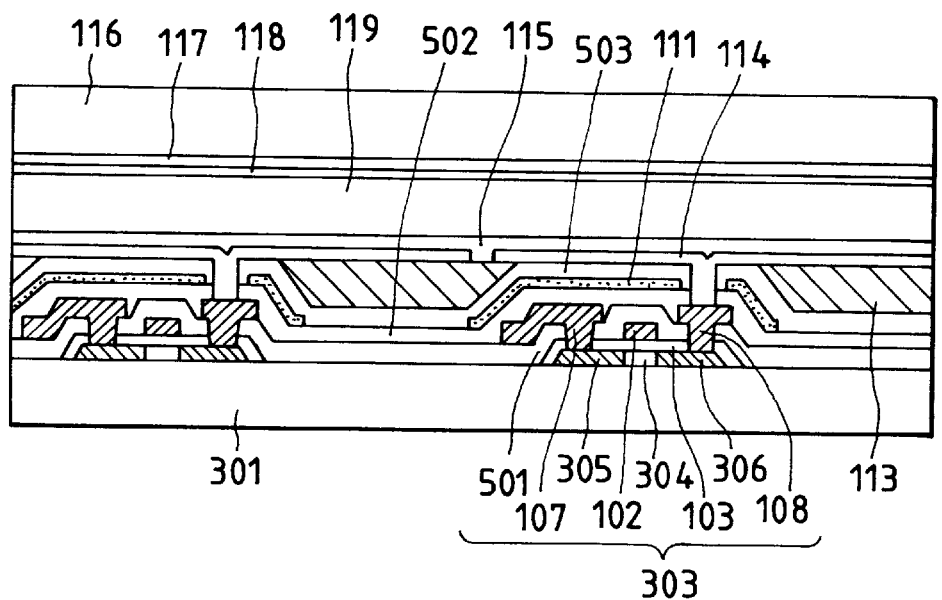
FIG. 16 is a cross-sectional view illustrating a part of a color liquid crystal display device according to a fifth embodiment of the present invention.
Figure 15A:
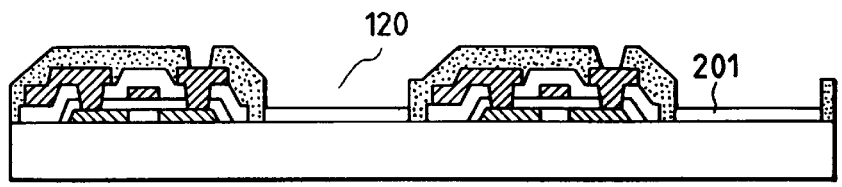
FIGS. 15A, 15B, 15C, 15D, 15E, and 15F are cross-sectional views illustrating production processes of the color liquid crystal display device according to the fourth embodiment of the present invention.
Figure 15B:
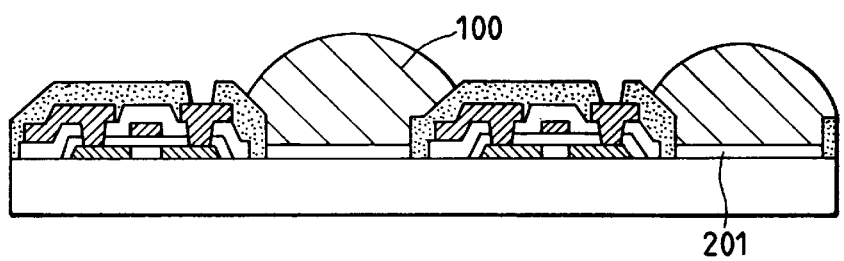
Figure 15C:
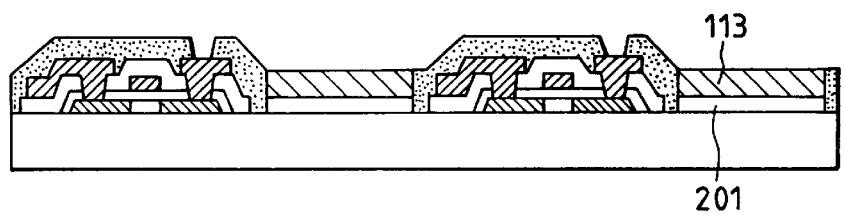
Figure 15D:
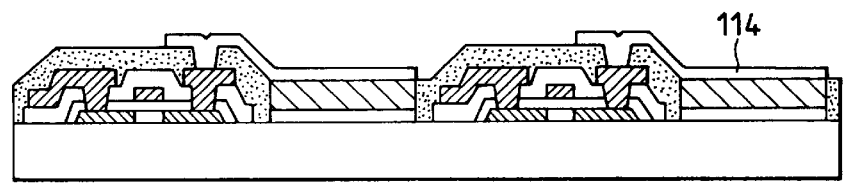
Figure 15E:
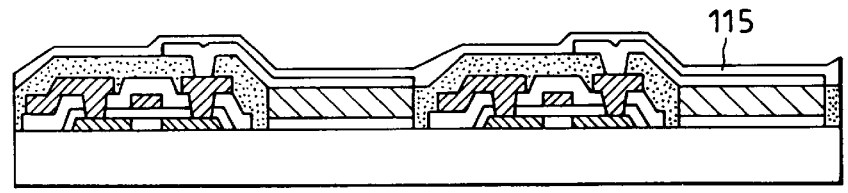
Figure 15F:
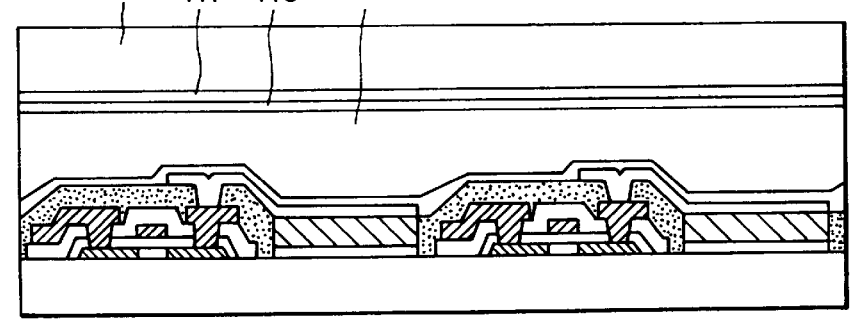
Figure 17A:
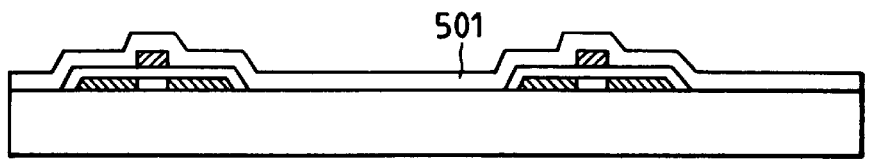
FIGS. 17A, 17B, 17C, 17D, 17E, 17F, 17G, 17H and 17I are cross-sectional views illustrating production processes of the color liquid crystal display device according to the fifth embodiment of the present invention.
Figure 17B:
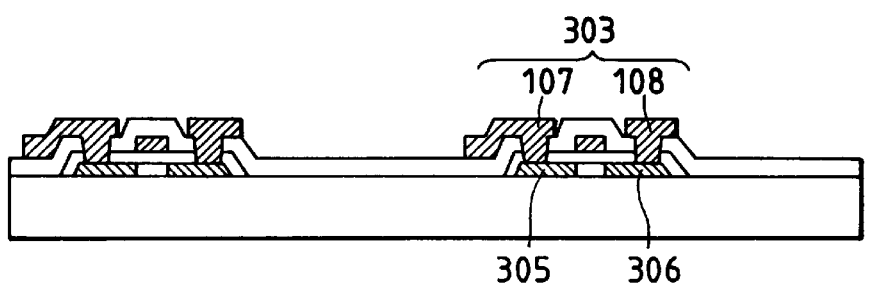
Figure 17C:
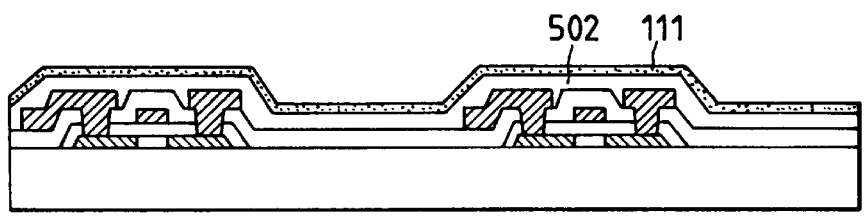
Figure 17D:
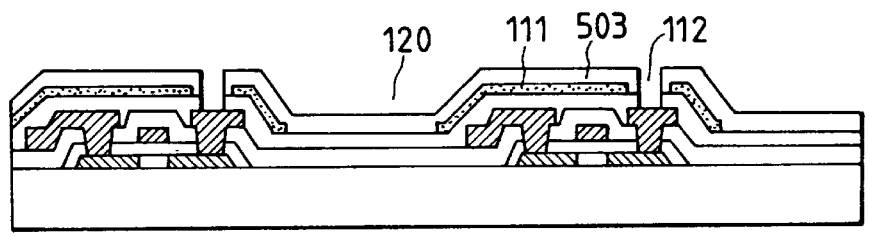
Figure 17E:
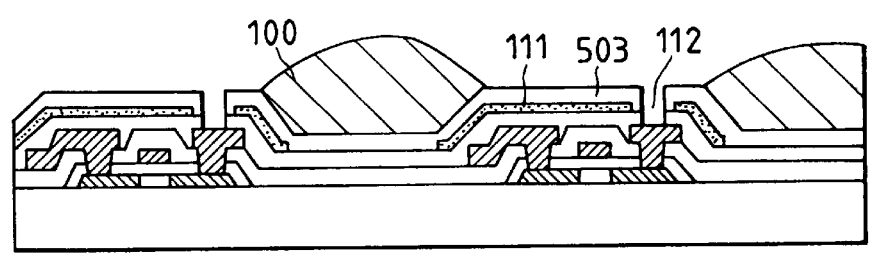
Figure 17F:
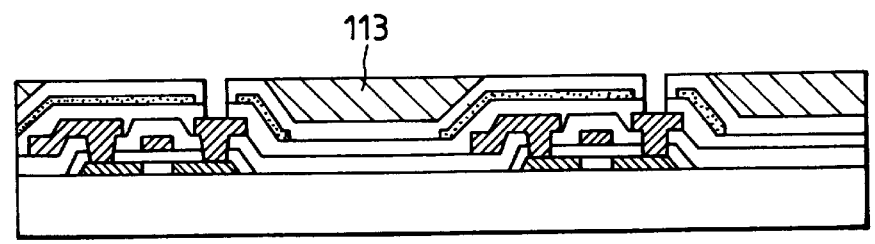
Figure 17G:
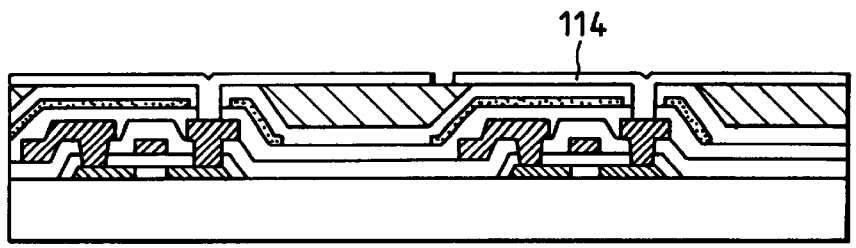
Figure 17H:
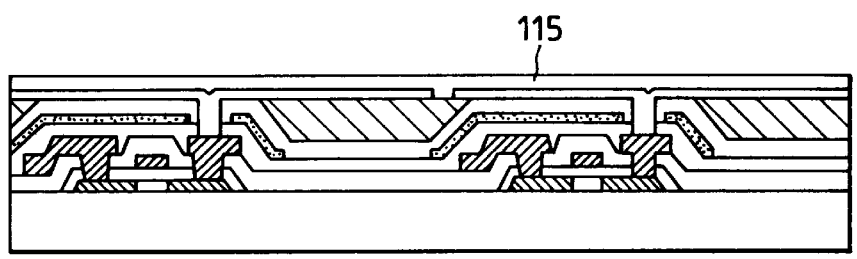
Figure 17I:
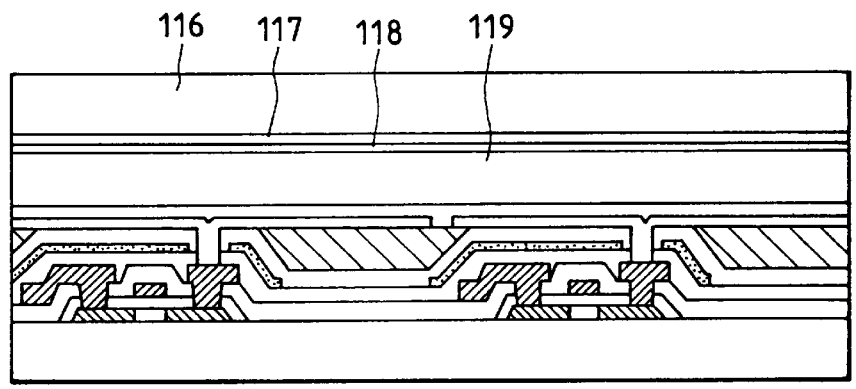
Figure 18:
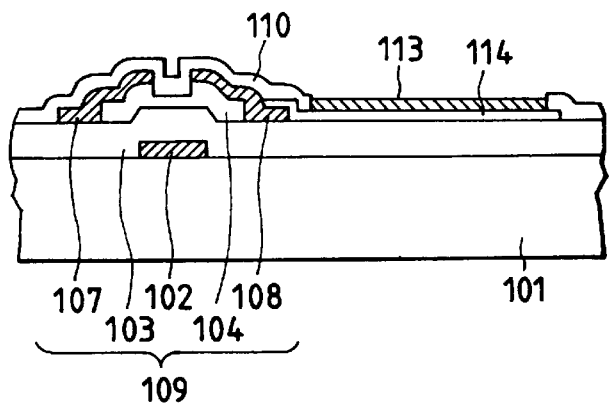
FIG. 18 is a cross-sectional view illustrating a part of one substrate of a conventional color liquid crystal display device.

FIG. 16 is a cross-sectional view illustrating a part of a color liquid crystal display device according to the fifth embodiment of the present invention. This device is such that a light-screening layer 111 is formed with a conductive material, and each transparent pixel electrode 114 is formed with it extended to and above a TFT 303, thereby forming a storage capacitor between the light-screening layer 111 and a transparent pixel electrode 114 through a third passivation film 503. Other reference numerals are the same as given in FIG. 8. As a result, contrast characteristics can be more improved like the second and fourth embodiments.

Production processes of the color liquid crystal display device shown in FIG. 14 are illustrated in FIGS. 17A to 17I. Until the process illustrated in FIG. 9C, the production processes for this device are the same as those for the color liquid crystal display device illustrated in FIG. 8. Therefore, only the processes of (d) to (l) are illustrated in FIGS. 17A to 17I.

(d) Subsequent to the process shown in FIG. 9C, a first passivation film 501 is formed over the whole surface of a first substrate.

(e) A source electrode 107 and a drain electrode 108 are formed in each source region 305 and each drain region 306. A material such as Al is used for the source electrode 107 and drain electrode 108.

(f) A second passivation film 502 and the light-screening layer 111 composed of a conductive material are formed over the whole surface of the substrate. An insulating film such as a SiN film is used for the second passivation film 502, while a metal such as Cr or Ti or an alloy thereof is used for the light-screening layer 111.

(g) After portions of the light-screening layer 111 corresponding to opening areas 120 and contact holes 112 are removed by etching, the third passivation film 503 having an ink repellency is formed, and a contact hole 112 is made on the drain electrode 108.

(h) A curable ink is applied to the opening area 120 by an ink-jet system like the first embodiment.

(i) The curable ink is cured by heating to form a color filter 113 the surface of which is flattened.

(j) The transparent pixel electrode 114 composed of ITO is formed on the color filter 113 and the TFT 303 and connected to the drain electrode 108 through the contact hole 112.

Like the third embodiment, an alignment film 115 is subsequently formed over the whole surface of the first substrate (k), and the first substrate is arranged in opposed relation to a second glass substrate 116, on which a transparent common electrode 117 and an alignment film 118 have been formed, to stick both substrates on each other. A liquid crystal 119 is then charged into a space between both substrates (l).

According to the present invention, as described above, drop of voltage applied to a liquid crystal due to the interposition of a color filter can be prevented, and good contrast characteristics can hence be cheaply achieved even when driven by a low voltage. In the present invention, a transparent electrode is further provided between the color filter and the substrate, whereby a storage capacitor is formed between the transparent electrode and a transparent pixel electrode. As a result, the contrast characteristics are more improved. A light-screening layer is provided on a TFT and the outer periphery of the color filter, whereby high precision alignment becomes unnecessary upon the superposition of two substrates. Therefore, production efficiency is enhanced. In the present invention, a transparent pixel electrode is extended to and above the TFT, and the light-screening layer is formed with a conductive material, whereby the same effect as the transparent electrode is added as described above can be brought about.

According to the present invention, an ink-jet system is used upon the formation of the color filter, and a curable resin is contained in inks, whereby there is no need of providing an ink-receiving layer on the substrate, so that a color liquid crystal display device can be produced through reduced processes at low cost.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color liquid crystal display device, which comprises the steps of:

forming a plurality of switching elements on a first transparent substrate;

providing a coating layer on the plural switching elements;

forming opening areas by etching the coating layer between the switching elements;

separately applying curable inks to predetermined opening areas between the switching elements by an ink-jet system to form a color filter by curing the curable inks;

forming a transparent electrode on the color filter;

forming a transparent electrode on a second transparent substrate; and charging a liquid crystal into a space between the first and second transparent substrates.

2. The process according to claim 1, wherein the coating layer is a light-screening layer.

3. The process according to claim 1, wherein the coating layer is a passivation film.

4. The process according to claim 1, wherein the coating layer has ink repellency.

5. The process according to claim 1, wherein the curable inks each contain a coloring material, a solvent and a curable resin.

6. The process according to claim 5, wherein the curable resin is a thermosetting resin.

7. The process according to claim 5, wherein a weight ratio of the coloring material to the resin in the ink falls within a range of from 10:1 to 1:10.

8. The process according to claim 5, wherein a solids content in the ink falls within a range of from 6 to 40% by weight.

9. The process according to claim 1, wherein each of the inks is applied in such a manner that the level of the ink becomes higher than the height from the first transparent substrate to the coating layer.

10. The process according to claim 1, wherein the inks are cured by heating after the application thereof.

11. The process according to claim 2, wherein the light-screening layer is composed of a conductive material.

12. The process according to claim 1, wherein the transparent electrode on the color filter is a pixel electrode.

13. A process for producing a color liquid crystal display device, which comprises the steps of:

forming a plurality of switching elements on a first transparent substrate;

providing a coating layer on the plural switching elements;

forming opening areas by etching the coating layer between the switching elements;

forming a transparent electrode in each of opening areas between the switching elements;

separately applying curable inks to predetermined opening areas between the switching elements by an ink-jet system to form a color filter by curing the curable inks;

forming a transparent electrode on the color filter;

forming a transparent electrode on a second transparent substrate; and charging a liquid crystal into a space between the first and second transparent substrates.

14. The process according to claim 13, wherein the coating layer is a light-screening layer.

15. The process according to claim 14, wherein the light-screening layer is composed of a conductive material.

16. The process according to claim 13, wherein the coating layer is a passivation film.

17. The process according to claim 13, wherein the coating layer has ink repellency.

18. The process according to claim 13, wherein the curable inks each contain a coloring material, a solvent and a curable resin.

19. The process according to claim 18, wherein the curable resin is a thermosetting resin.

20. The process according to claim 18, wherein a weight ratio of the coloring material to the resin in the ink falls within a range of from 10:1 to 1:10.

21. The process according to claim 18, wherein a solids content in the ink falls within a range of from 6 to 40% by weight.

22. The process according to claim 13, wherein each of the inks is applied in such a manner that the level of the ink becomes higher than the height from the first transparent substrate to the coating layer.

23. The process according to claim 13, wherein the inks are cured by heating after the application thereof.

24. The process according to claim 13, wherein the transparent electrode on the color filter is a pixel electrode.

* * * * *

UNITED STATES PATENT AND TRADEMARK OFFICE
CERTIFICATE OF CORRECTION

PATENT NO. : 6,132,800
DATED : October 17, 2000
INVENTOR(S) : Tetsuya Shimada et al.

It is certified that error appears in the above-identified patent and that said Letters Patent is hereby corrected as shown below:

Title page,
Item [56] References Cited,
Insert -- *Attorney, Agent or Firm* -- Fitzpatrick, Cella, Harper & Scinto --.

CPA,
Insert -- [*] Notice: This patent issued on a continued prosecution application filed under 37 CFR 1.53(d), and is subject to the twenty year patent term provisions of 35 U.S.C. 154 (a) (2). --.

Column 2,
Line 49, should read -- Figs. 2A to 2L are --;
Line 65, "7A, 7B, 7C, 7D and 7E" should read -- 7A to 7E --.

Column 3,
Line 6, should read -- Figs. 9A to 9L are --;
Line 26, should read -- Figs. 15A to 15F are cross --;
Line 34, should read -- Figs. 17A to 17I. --.

Column 10,
Line 62, "and" should read --¶ sealing the first and second transparent substrates; and --.

Column 12,
Line 6, "and" should read --¶ sealing the first and second transparent substrates; and --;
Line 34, insert -- 25. A process for producing a color filter substrate, which comprises the steps of:

forming a plurality of switching elements on a first transparent substrate;
providing a coating layer on the plural switching elements;
forming opening areas by etching the coating layer between the switching elements; and
separately applying curable inks to predetermined opening areas between the switching elements by an ink-jet system for form a color filter by curing the curable inks.

26. The process according to Claim 25, wherein a transparent electrode is formed on the color filter.

UNITED STATES PATENT AND TRADEMARK OFFICE
CERTIFICATE OF CORRECTION

PATENT NO. : 6,132,800
DATED : October 17, 2000
INVENTOR(S) : Tetsuya Shimada et al.

It is certified that error appears in the above-identified patent and that said Letters Patent is hereby corrected as shown below:

27. The process according to Claim 25, wherein the coating layer is a light-screening layer.

28. The process according to Claim 25, wherein the coating layer is a passivation film.

29. A process for producing a color liquid crystal display device, which comprises the steps of:
forming a plurality of switching elements on a first transparent substrate;
providing a coating layer on the plural switching elements;
forming opening areas by etching the coating layer between the switching elements; and
separately applying curable inks to predetermined opening areas between the switching elements by an ink-jet system to form a color filter by curing the curable inks.

30. The process according to Claim 29, wherein a transparent electrode is formed on the color filter.

31. The process according to Claim 29, wherein the coating layer is a light-screening layer.

32. The process according to Claim 29, wherein the coating layer is a passivation film. --.

Signed and Sealed this

Fifteenth Day of January, 2002

Attest:

JAMES E. ROGAN
Director of the United States Patent and Trademark Office

Attesting Officer